(12) United States Patent
Wolstencroft

(10) Patent No.: US 10,780,817 B2
(45) Date of Patent: Sep. 22, 2020

(54) METAL WRAPPED BUNGEE ASSEMBLY

(71) Applicant: Sebastian Wolstencroft, Moon Township, PA (US)

(72) Inventor: Sebastian Wolstencroft, Moon Township, PA (US)

( * ) Notice: Subject to any disclaimer, the term of this patent is extended or adjusted under 35 U.S.C. 154(b) by 113 days.

(21) Appl. No.: 16/242,815

(22) Filed: Jan. 8, 2019

(65) Prior Publication Data

US 2020/0215959 A1   Jul. 9, 2020

(51) Int. Cl.
*D07B 1/00* (2006.01)
*B60P 7/08* (2006.01)
*B62J 7/08* (2006.01)

(52) U.S. Cl.
CPC .......... *B60P 7/0869* (2013.01); *B60P 7/0876* (2013.01); *B62J 7/08* (2013.01)

(58) Field of Classification Search
CPC .......... B60P 7/0869; B60P 7/0876; B62J 7/08
See application file for complete search history.

(56) References Cited

U.S. PATENT DOCUMENTS

| | | | | |
|---|---|---|---|---|
| 1,853,666 A * | 4/1932 | Crimmins | ................. | D02G 3/32 66/190 |
| 2,561,487 A * | 7/1951 | Bailhe | ..................... | B63B 21/20 114/230.26 |
| 3,751,772 A * | 8/1973 | Grandjanny | ............ | F16G 11/02 24/115 A |
| 4,513,063 A * | 4/1985 | Hashi | .................. | A63B 21/0552 224/318 |
| 4,694,541 A * | 9/1987 | Skyba | ........................ | F16F 1/46 24/300 |
| 5,383,259 A * | 1/1995 | McIntire | .................... | B62J 7/08 24/136 R |
| 5,486,649 A * | 1/1996 | Gareis | ................ | H01B 11/1016 174/10 |
| 5,504,274 A | 4/1996 | McCabe | | |
| 5,540,154 A * | 7/1996 | Wilcox | ..................... | C06C 5/00 102/275.1 |
| 5,712,010 A * | 1/1998 | Russek | .................... | D04C 1/02 138/123 |
| 6,014,794 A * | 1/2000 | Mc Coy | ..................... | B62J 7/08 24/265 H |
| 6,140,589 A * | 10/2000 | Blackmore | .......... | H01B 7/0009 174/128.1 |
| 6,202,263 B1 * | 3/2001 | Harker | ....................... | B62J 7/08 114/230.2 |
| 6,247,359 B1 * | 6/2001 | De Angelis | .............. | D07B 1/14 73/158 |

(Continued)

*Primary Examiner* — Jason W San

(57) ABSTRACT

A metal wrapped bungee assembly that resists abrasion and corrosion includes a bungee cord that includes an elastic member and a pair of hooks. The bungee cord is stretchable between objects for attaching the objects together. Additionally, the elastic member is comprised of a resiliently stretchable material. A sleeve is positioned around the elastic member of the bungee cord. The sleeve is comprised of a metallic material for protecting the elastic member from abrasion. Moreover, the sleeve comprises a plurality of enmeshed wires such that the sleeve is expandable and collapsible along a longitudinal axis extending through each of the hooks. The sleeve is comprised of a corrosion resistant to resist rusting in the rain.

8 Claims, 2 Drawing Sheets

(56) References Cited

U.S. PATENT DOCUMENTS

| | | | | |
|---|---|---|---|---|
| 6,255,592 B1 * | 7/2001 | Pennington | ........... | E21B 17/206 174/103 |
| 6,276,031 B1 * | 8/2001 | Haiduk | ........... | B62J 7/08 24/16 PB |
| 6,317,938 B1 * | 11/2001 | Durette | ........... | B62J 7/08 24/298 |
| 6,475,220 B1 * | 11/2002 | Whiteside | ........... | A61B 17/82 606/224 |
| D525,861 S * | 8/2006 | Mackey | ........... | D8/367 |
| 7,195,434 B1 * | 3/2007 | Kuo | ........... | B60P 7/0876 410/118 |
| 7,454,818 B1 * | 11/2008 | Backman, III | ........... | B60P 7/0823 24/300 |
| 8,133,241 B2 * | 3/2012 | Boyd | ........... | A61B 17/064 606/151 |
| 8,408,852 B1 * | 4/2013 | Bullock | ........... | B60P 7/15 410/118 |
| 8,525,033 B2 * | 9/2013 | Grether | ........... | D07B 1/02 174/128.1 |
| 9,562,321 B2 * | 2/2017 | Manabe | ........... | F16G 11/048 |
| 9,590,408 B2 * | 3/2017 | Dahl | ........... | H02G 13/00 |
| 10,004,166 B2 * | 6/2018 | Adachi | ........... | B60R 16/0215 |
| 10,207,659 B2 * | 2/2019 | Ohgushi | ........... | B60R 16/0215 |
| RE47,927 E * | 4/2020 | Ragner | ........... | D02G 3/22 |
| 2005/0050695 A1 * | 3/2005 | Mackey | ........... | B26J 7/08 24/300 |
| 2007/0044992 A1 * | 3/2007 | Bremnes | ........... | H01B 7/183 174/102 R |
| 2007/0130734 A1 * | 6/2007 | Handel | ........... | B62J 7/08 24/599.1 |
| 2007/0271897 A1 * | 11/2007 | Hanna | ........... | D07B 1/162 57/238 |
| 2015/0257315 A1 * | 9/2015 | Wagner | ........... | H01B 3/18 343/897 |

\* cited by examiner

US 10,780,817 B2

METAL WRAPPED BUNGEE ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to wrapped bungee devices and more particularly pertains to a new wrapped bungee device for resisting abrasion and corrosion.

BRIEF SUMMARY OF THE INVENTION

An embodiment of the disclosure meets the needs presented above by generally comprising a bungee cord that includes an elastic member and a pair of hooks. The bungee cord is stretchable between objects for attaching the objects together. Additionally, the elastic member is comprised of a resiliently stretchable material. A sleeve is positioned around the elastic member of the bungee cord. The sleeve is comprised of a metallic material for protecting the elastic member from abrasion. Moreover, the sleeve comprises a plurality of enmeshed wires such that the sleeve is expandable and collapsible along a longitudinal axis extending through each of the hooks. The sleeve is comprised of a corrosion resistant to resist rusting in the rain.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
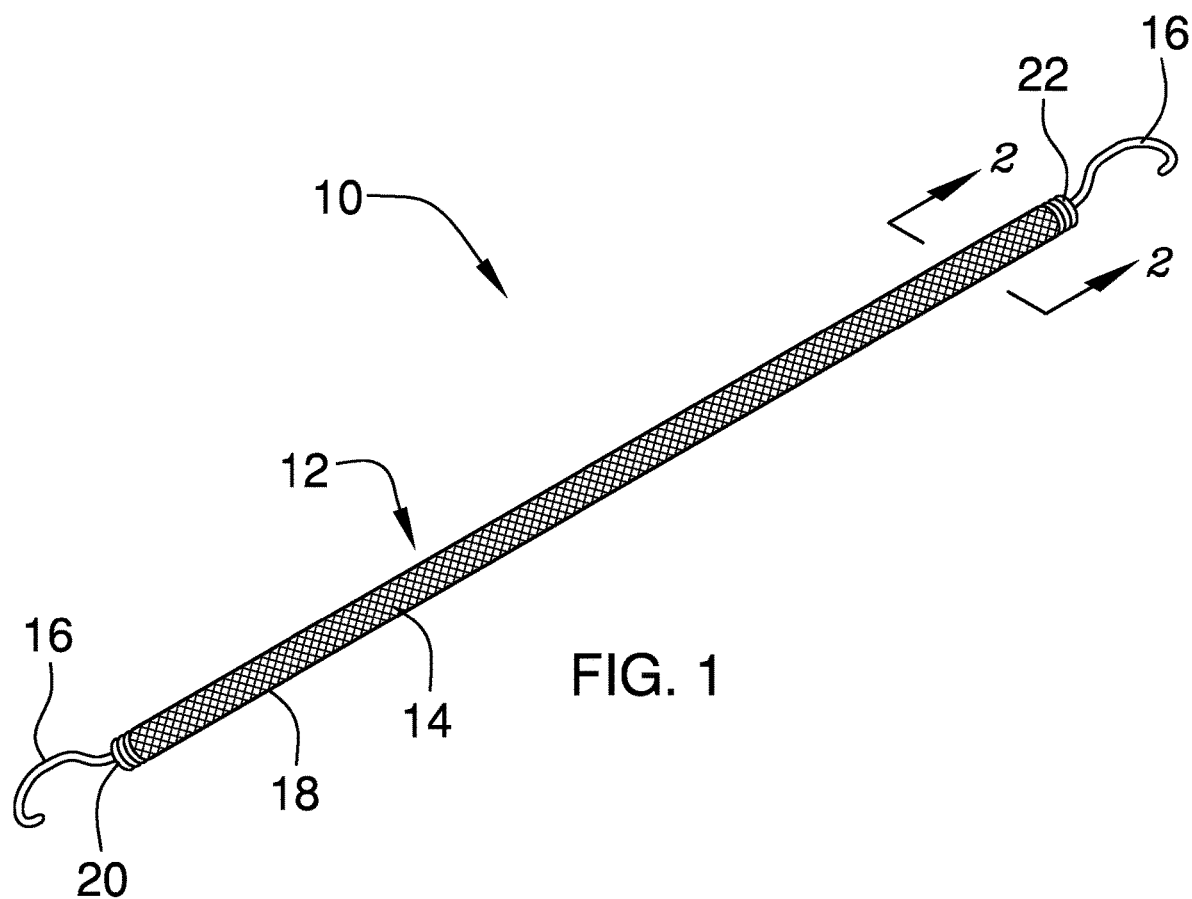
FIG. 1 is a perspective view of a metal wrapped bungee assembly according to an embodiment of the disclosure.
Figure 2:
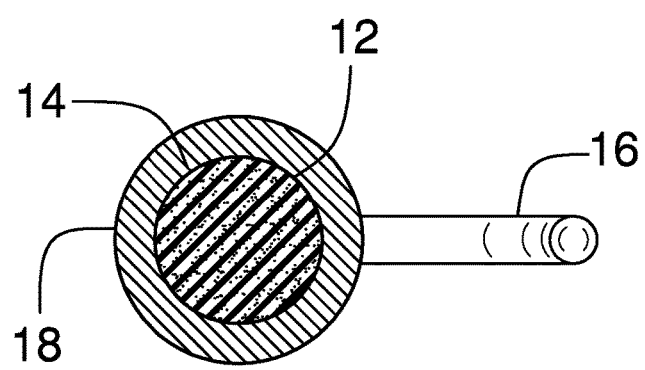
FIG. 2 is a cross sectional view taken along line 2-2 of FIG. 1 of an embodiment of the disclosure.
Figure 3:
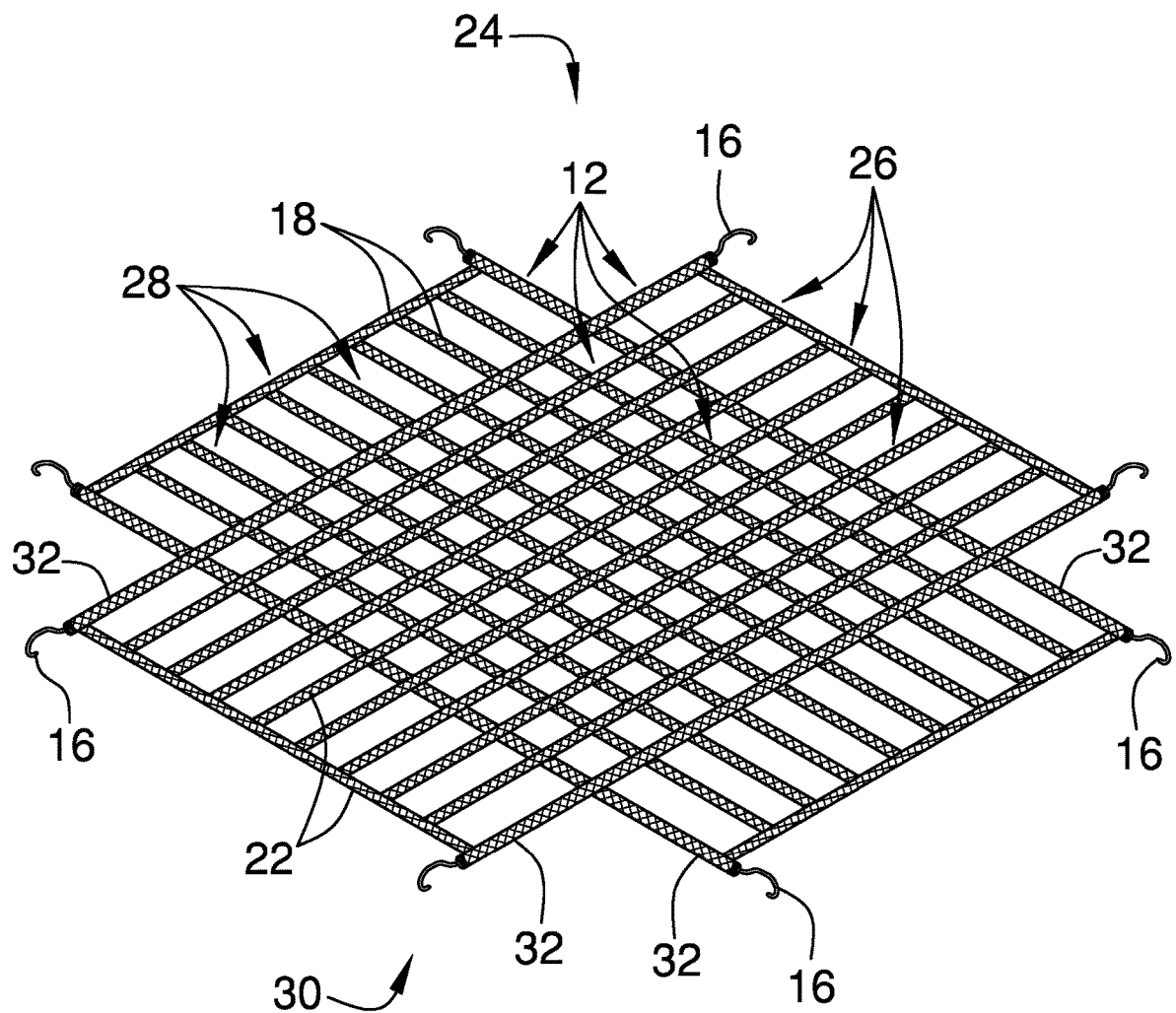
FIG. 3 is a perspective view of an alternative embodiment of the disclosure.

With reference now to the drawings, and in particular to FIGS. 1 through 3 thereof, a new wrapped bungee device embodying the principles and concepts of an embodiment of the disclosure and generally designated by the reference numeral 10 will be described.

As best illustrated in FIGS. 1 through 3, the metal wrapped bungee assembly 10 generally comprises a bungee cord 12 that has an elastic member 14 and a pair of hooks 16. The bungee cord 12 is stretchable between objects for attaching the objects together. The elastic member 14 is comprised of a resiliently stretchable material, and the elastic member 14 is stretchable between a relaxed length and a fully stretched length. The bungee cord 12 may be a rubber bungee cord or any other conventional type of bungee cord. Additionally, the bungee cord 12 may be manufactured in a variety of lengths.

A sleeve 18 is positioned around the elastic member 14 of the bungee cord 12 and the sleeve 18 is comprised of a metallic material, such as a metal alloy or the like. Thus, the sleeve 18 protects the elastic member 14 from abrasion thereby extending the service life of the bungee cord 12. The sleeve 18 may comprise a plurality of enmeshed wires, a single wire coiled around the sleeve 18, or any other design that will facilitate the sleeve 18 to be expandable and collapsible along a longitudinal axis extending through each of the hooks 16.

The sleeve 18 is comprised of a corrosion resistant material so the sleeve 18 resists rusting in the rain. The sleeve 18 has a first end 20 and a second end 22, and each of the first 20 and second 22 ends of the sleeve 18 is attached to a respective one of the hooks 16. The sleeve 18 is expandable to a maximum length that is equal to the fully stretched length of the elastic member 14. Further, the sleeve 18 is collapsible to a minimum length that is equal to the relaxed length of the elastic member 14.

In an alternative embodiment 24 as shown in FIG. 3, a plurality of the bungee cords 12 may be provided. The plurality of bungee cords 12 may be arranged into a first set of bungee cords 26 that are oriented perpendicular to and are coupled to a second set of bungee cords 28. Thus, the first 26 and second 28 sets of bungee cords may form a net 30. Moreover, each of the first 26 and second 28 sets of bungee cords includes a pair of outermost bungee cords 32. Each of the outermost bungee cords 32 of each of the first 26 and second 28 sets of bungee cords has a pair of hooks 16 associated therewith. Each of the hooks 16 can engage an object for retaining the net 30 over the object. Continuing in the alternative embodiment 24, a plurality of the sleeves 18 is each positioned around a respective one of the bungee cords 12.

In use, the bungee cord 12 is employed on the conventional means of bungee cords, in that the bungee cord 12 can be stretched over a tarp, an article of cargo or any other object. The sleeve 18 inhibits the elastic member 14 of the bungee cord 12 from being damaged thereby extending the service life of the bungee cord 12. Moreover, the expandable and collapsible construction of the sleeve 18 facilitates the sleeve 18 to cover the elastic member 14 when the elastic member 14 is fully stretched. The net 30 described in the alternative embodiment 24 can be laid over the object in the convention of a cargo net.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A metal wrapped bungee assembly being configured to resist abrasion and impact damage, said assembly comprising:
   a bungee cord having an elastic member and a pair of hooks, said bungee cord being stretchable between objects for attaching the objects together, said elastic member being comprised of a resiliently stretchable material; and
   a sleeve being positioned around said elastic member of said bungee cord, said sleeve being comprised of a metallic material for protecting said elastic member from abrasion, said sleeve comprising a plurality of enmeshed wires such that said sleeve is expandable and collapsible along a longitudinal axis extending through each of said hooks, said sleeve being comprised of a corrosion resistant material wherein said sleeve is configured to inhibit rusting in the rain.

2. The assembly according to claim 1, wherein:
   said elastic member is stretchable between a relaxed length and a fully stretched length; and
   said sleeve has a first end and a second end, each of said first and second ends of said sleeve being attached to a respective one of said hooks.

3. A metal wrapped bungee assembly being configured to resist abrasion and impact damage, said assembly comprising:
   a bungee cord having an elastic member and a pair of hooks, said bungee cord being stretchable between objects for attaching the objects together, said elastic member being comprised of a resiliently stretchable material, said elastic member being stretchable between a relaxed length and a fully stretched length; and
   a sleeve being positioned around said elastic member of said bungee cord, said sleeve being comprised of a metallic material for protecting said elastic member from abrasion, said sleeve comprising a plurality of enmeshed wires such that said sleeve is expandable and collapsible along a longitudinal axis extending through each of said hooks, said sleeve being comprised of a corrosion resistant material wherein said sleeve is configured to inhibit rusting in the rain, said sleeve having a first end and a second end, each of said first and second ends of said sleeve being attached to a respective one of said hooks.

4. The assembly according to claim 3, wherein said sleeve is expandable to a maximum length being equal to said fully stretched length of said elastic member, said sleeve being collapsible to a minimum length being equal to said relaxed length of said elastic member.

5. A metal wrapped bungee assembly being configured to resist abrasion and impact damage, said assembly comprising:
   a bungee cord having an elastic member and a pair of hooks, said bungee cord being stretchable between objects for attaching the objects together, said elastic member being comprised of a resiliently stretchable material, said elastic member being stretchable between a relaxed length and a fully stretched length; and
   a sleeve being positioned around said elastic member of said bungee cord, said sleeve being comprised of a metallic material for protecting said elastic member from abrasion, said sleeve comprising a plurality of enmeshed wires such that said sleeve is expandable and collapsible along a longitudinal axis extending through each of said hooks, said sleeve being comprised of a corrosion resistant material wherein said sleeve is configured to inhibit rusting in the rain, said sleeve having a first end and a second end, each of said first and second ends of said sleeve being attached to a respective one of said hooks, said sleeve being expandable to a maximum length being equal to said fully stretched length of said elastic member, said sleeve being collapsible to a minimum length being equal to said relaxed length of said elastic member.

6. The assembly according to claim 5, further comprising a plurality of said bungee cords, said plurality of bungee cords being arranged into a first set of bungee cords being oriented perpendicular and being coupled to a second set of bungee cords such that said first and second sets of bungee cords forms a net.

7. The assembly according to claim 6, wherein each of said first and second sets of bungee cords includes a pair of outermost bungee cords, each of said outermost bungee cords of each of said first and second sets of bungee cords having a pair of hooks being associated therewith, each of said hooks engaging an object for retaining said net over the object.

8. The assembly according to claim 7, further comprising a plurality of said sleeves, each of said sleeves being positioned around a respective one of said bungee cords.

* * * * *